United States Patent
Thiele

(10) Patent No.: US 7,480,461 B2
(45) Date of Patent: Jan. 20, 2009

(54) DATA PROCESSING NETWORK HAVING AN OPTICAL NETWORK INTERFACE

(75) Inventor: Matthew J. Thiele, Hampstead, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 674 days.

(21) Appl. No.: 10/529,983

(22) PCT Filed: Aug. 28, 2003

(86) PCT No.: PCT/US03/26956

§ 371 (c)(1),
(2), (4) Date: Mar. 31, 2005

(87) PCT Pub. No.: WO2004/021609

PCT Pub. Date: Nov. 3, 2004

(65) Prior Publication Data

US 2006/0245762 A1    Nov. 2, 2006

Related U.S. Application Data

(60) Provisional application No. 60/406,831, filed on Aug. 29, 2002.

(51) Int. Cl.
*H04B 10/00* (2006.01)

(52) U.S. Cl. .................... 398/116; 398/141
(58) Field of Classification Search ............ 398/115, 398/116, 140, 164, 141, 156
See application file for complete search history.

(56) References Cited

U.S. PATENT DOCUMENTS

| 4,554,673 | A | * | 11/1985 | Stevens | 375/356 |
| 4,748,617 | A | * | 5/1988 | Drewlo | 398/98 |
| 5,054,873 | A | * | 10/1991 | Davis et al. | 385/27 |
| 6,016,211 | A | * | 1/2000 | Szymanski et al. | 398/1 |
| 6,453,406 | B1 | * | 9/2002 | Sarnikowski et al. | 712/11 |
| 6,650,803 | B1 | * | 11/2003 | Ramaswami et al. | 385/17 |

* cited by examiner

*Primary Examiner*—Christina Y Leung
(74) *Attorney, Agent, or Firm*—Daniel J. Long; Antony P. Ng; Dillon & Yudell LLP

(57) ABSTRACT

An optical data processing network having an optical network interface is disclosed. The optical data processing network includes a first multi-processor system and a second multi-processor system. The first multi-processor system includes a first set of processors and a first set of optical network interfaces electrically coupled to the first set of processors. Similarly, the second multi-processor system includes a second set of processors and a second set of optical network interfaces electrically coupled to the second set of processors. An optical cable is connected between the first set and the second set of optical network interfaces. The first multi-processor system communicates with the second multi-processor system via the optical cable.

4 Claims, 2 Drawing Sheets

DATA PROCESSING NETWORK HAVING AN OPTICAL NETWORK INTERFACE

RELATED PATENT APPLICATION

The present patent application claims priority to provisional application U.S. Ser. No. 60/406,831, filed on Aug. 29, 2002.

BACKGROUND OF THE INVENTION

1. Technical Field

The present invention relates to computer networks in general, and in particular to optical computer networks. Still more particularly, the present invention relates to a data processing network having an optical network interface.

2. Description of the Related Art

In general, multi-processor systems are employed to solve problems that cannot be solved quickly or efficiently with single processor systems. All processors within a multi-processor system are typically interconnected to each other. Such interconnections are typically accomplished by a network switch connected to each processor that can switch signals from any processor to any other processor.

As the processing speed of processors become faster, the speed that they need to communicate with each other also increases in order to maintain optimum performance in a multi-processor system. The amount of data transferred among processors also increases as the speed of the processor increases. Thus, the network switches tend to become the bottle-neck of a multi-processor system and subsequently limit the overall performance of the multi-processor system.

Further, in some cases, the more processors there are in a multi-processor system, the more wires are needed to connect from processors to a network switch. As a result, the cabling becomes too bulky.

The present disclosure describes an improved data processing network having multi-processors.

SUMMARY OF THE INVENTION

In accordance with a preferred embodiment of the present invention, an optical data processing network includes a first multi-processor system and a second multi-processor system. The first multi-processor system includes a first set of processors and a first set of optical network interfaces electrically coupled to the first set of processors. Similarly, the second multi-processor system includes a second set of processors and a second set of optical network interfaces electrically coupled to the second set of processors. An optical cable is connected between the first set and the second set of optical network interfaces. The first multi-processor system communicates with the second multi-processor system via the optical cable.

The optical network interface is a single integrated component formed by two chips. The first chip uses optical circuitry with the various voltage and signal characteristics that are required for optical communication. The second chip uses electrical circuitry with the various voltage and signal characteristics that are required for electrical communication. The optical network interface is connected to both a processor and a fiber optic network. During operation, the first chip interfaces with the fiber optic network and the second chip interfaces with the processor to provide an optical channel between the processor and the fiber optic network.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Given the density that can be economically achieved with the use of vertical cavity surface emitting laser (VCSEL) technology, a solution for the above-mentioned bottle-neck problem of a multi-processor data processing network is to utilize a group of optical fibers that provides full-time point-to-point connections between every processor. Such solution reduces the overall complexity and expense of providing routing and switching functions required by most multi-processor data processing network today. An additional benefit is the degree of deterministic latency that can be supported with the hardwired connections from one processor to another.

Figure 1:
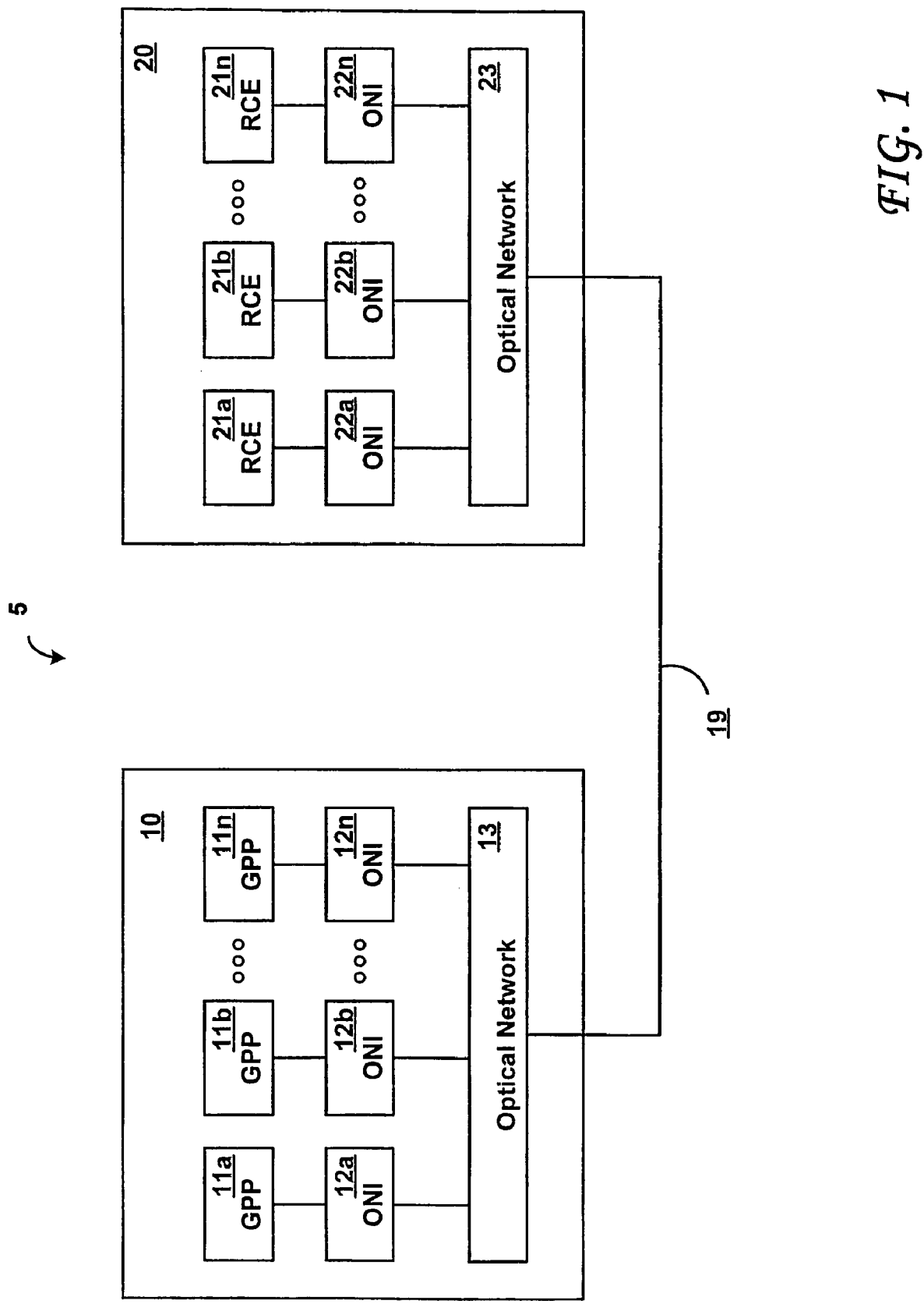
FIG. 1 is a block diagram of a data processing network, in accordance with a preferred embodiment of the present invention.

Referring now to the drawings and in particular to FIG. 1, there is illustrated a block diagram of a data processing network, in accordance with a preferred embodiment of the present invention. As shown, a data processing network 5 includes a multi-processor system 10 and a multi-processor system 20. Multi-process system 10 includes multiple general purpose processors (GPPs), such as GPPs 11a-11n. Each of GPPs 11a-11n is connected to a respective one of optical network interfaces 12a-12n. Optical network interfaces 12a-12n are connected to an optical network 13.

Similarly, multi-processor system 20 includes multiple reconfigurable compute engines (RCEs), such as RCEs 21a-21n. Each of RCEs 21a-21n is connected to a respective one of optical network interfaces 22a-22n. Optical network interfaces 22a-22n are also connected to an optical network 23.

Multi-processor system 10 and multi-processor system 20 communicate to each other via optical network 13, an optical cable 19 and optical network 23.

Figure 2:
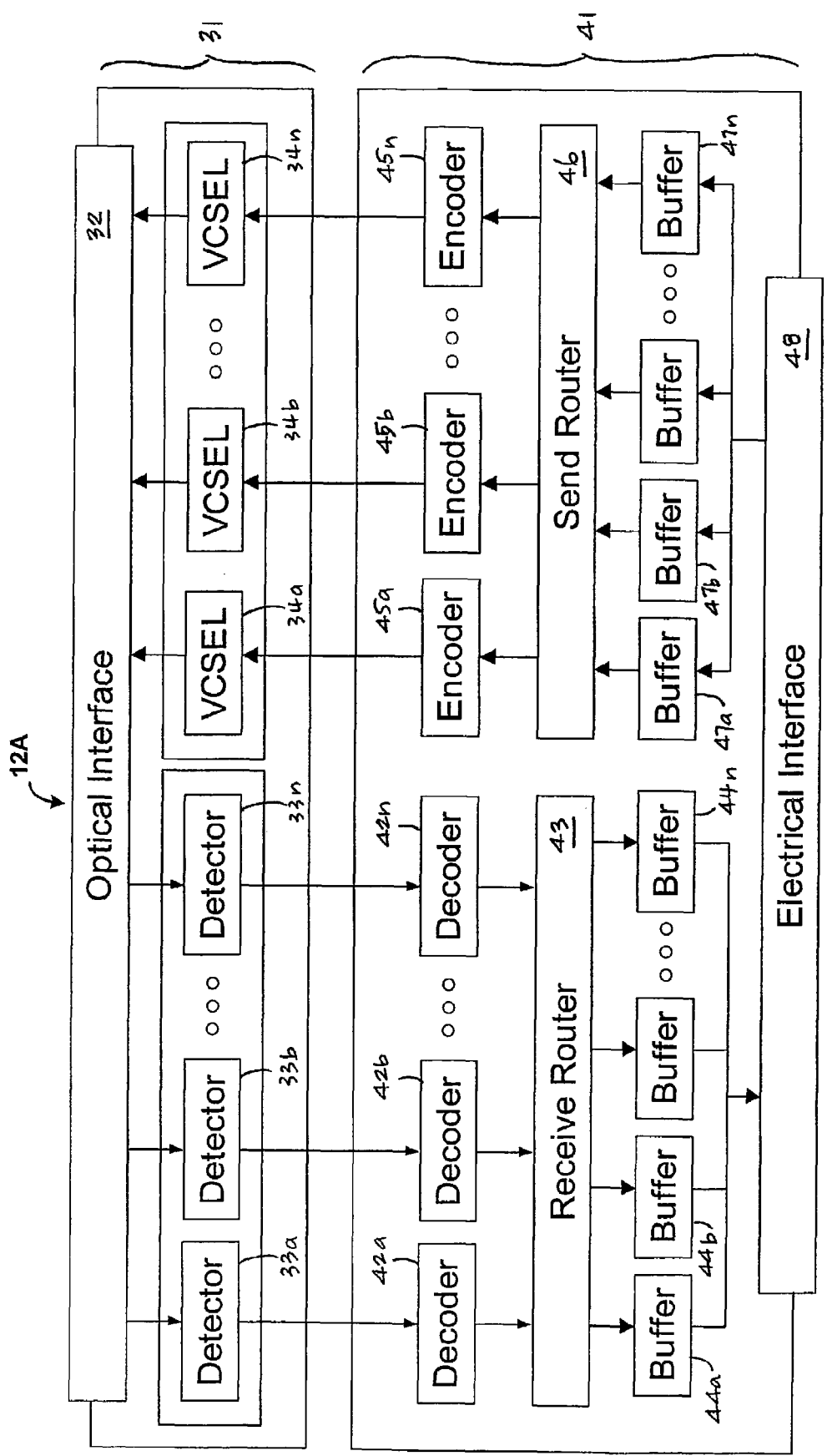
FIG. 2 is a block diagram of an optical network interface within the multi-processor system of FIG. 1, in accordance with a preferred embodiment of the present invention.

Preferably, optical network interfaces 12a-12n and 22a-22n are identical to each other. Hence, only optical network interface 12a will be further explained in details. With reference now to FIG. 2, there is depicted a block diagram of optical network interface 12a within multi-processor system 10 from FIG. 1, in accordance with a preferred embodiment of the present invention. In general, optical network interface 12a includes two components, namely, an optical component 31 and an electrical component 41. Optical component 31 includes an optical interface 32, multiple detectors 33a-33n, and multiple VCSELs 34a-34n. VCSELs 34a-34n in combination with detectors 33a-33n, which is intended to be connected to an optical network, transmits and receives optical signals to and from the optical network. Once an optical signal is received by optical interface 32, detectors 33a-33n translate the received optical signal to an electrical signal.

VCSELs 34a-34n convert electrical signals to optical signals to be transmitted to optical interface 32.

Electrical component 41 includes circuitry for managing the networking functions of optical network interface 12a. Specifically, electrical component 41 includes multiple decoders 42a-42n, a receive router 43, multiple receive buffers 44a-44n, multiple encoders 45a-45n, a send router 46, multiple send buffers 47a-47n, and an electrical interface 48.

Electrical interface 48 receives messages (i.e., electrical signals) originated from, for example, GPP 11a (from FIG. 1). The messages are structured as a sequential set of parallel data words. The data words are presented to electrical interface 48 as 64 parallel electrical connections. Electrical interface 48 is designed to be compatible with the above-mentioned signal structure and forwards the data to one of several available send buffers 47a-47n. Send router 46 is subsequently signaled that one of send buffers 47a-47n has been loaded and is ready for transmission. The first several bytes of send buffers 47a-47n contain the priority and destination address for the contents of that buffer. Send router 46 then connects that buffer to one of encoders 45a-45n that is connected to the specified destination node's dedicated link. The data is then clocked into one of encoders 45a-45n where the data is encoded as an 8 B/10 B structure. Next, the data is converted from parallel data to a serial data stream. The serial data stream is then forwarded to one of VCSELs 34a-34n as a differential electrical signal preferably at a rate of 2.5 Gigabit per second.

In contrast, optical signals from an optical network are presented to optical interface 32 and the optical signals are forwarded to one of detectors 33a-33n in which the optical signals are converted to differential electrical signals in the form of a serial data stream. The rate of conversion is preferably 2.5 gigabits per second. The serial data stream is then forwarded to one of decoders 42a-42n in which the serial data stream is converted to a corresponding set of parallel data. The 8 B/10 B encoding is then removed from the parallel data to recover the data. The data is then forwarded to receive router 43 where the data is directed into an available buffer. When message has been received, GPP 11a is signaled. Once GPP 11a indicates that it is ready to accept messages, electrical interface 48 performs the final conversion to make the data compatible with the interface of GPP 11a.

It is possible to modify the operation of the protocol to support a zero-copy transfer of data, if necessary. In such a case, a destination node is signaled by a source node. The size of the message is then communicated. Once the source node receives a "clear to send" signal from the destination node, the paths is established through the send and receive routers and the transmission of data is initiated. The path is maintained until the transmission is complete.

Due to differences in technologies and associated manufacturing processes, optical component 31 and electrical component 41 are preferably manufactured as separate components. Each of optical component 31 and electrical component 41 is designed with complementary physical and electrical characteristics. The process of manufacturing optical component 31 and electrical component 41 is described in details in the U.S. Pat. No. 6,316,286 B1, the pertinent of which is incorporated by reference herein. Bump bonding of the chip having optical component 31 and the chip having electrical component 41 may be employed to form the final integrated component, that is, optical network interface 12a.

As has been described, the present invention provides a multi-processor network system having an optical network interface. Although processors are used to illustrate the preferred embodiment of the present invention, it is understood by those skilled in the art that the processor can be replaced by similar devices such as gateways, field programmable gate arrays, sensors, etc.

While the invention has been particularly shown and described with reference to a preferred embodiment, it will be understood by those skilled in the art that various changes in form and detail may be made therein without departing from the spirit and scope of the invention.

What is claimed is:

1. An optical network interface comprising:
   an optical component having
      an optical interface adapted to connect to an optical device capable of transmitting and receiving optical signals;
      a detector array, coupled to said optical interface, for translating optical signals received from said optical interface to corresponding differential electrical signals in the form of a serial data stream;
      a vertical cavity surface emitting laser (VCSEL) array, coupled to said optical interface, for translating electrical signals to corresponding optical signals to be transmitted to said optical interface; and
   an electrical component having
      a decoder array, coupled to said detector array, for converting said serial data stream to a corresponding set of parallel data;
      a receive router coupled to said decoder array;
      a plurality of receive buffers, coupled to said receive router, wherein said parallel data is directed to one of said receive buffers by said receive router;
      a plurality of send buffers;
      an electrical interface adapted to connect to an electrical device capable of transmitting and receiving electrical signals, wherein said electrical interface receives parallel data from said one receiver buffer and sends said parallel data to said electrical device, wherein said electrical interface also directs parallel data received from said electrical device to one of said send buffers;
      a send router, coupled to said send buffers, for routing said parallel data received from said electrical device; and
      a plurality of encoders, coupled to said router, wherein one of said encoders received parallel data received from said electrical device and converts said parallel data received from said electrical device to a second serial data stream to be sent to one of said VCSELs as differential electrical signals.

2. The optical network interface of claim 1, wherein said optical component and said electrical component are connected to each other via bump bonding.

3. The optical network interface of claim 1, wherein said decoder removes 8B/10B encoding from parallel data.

4. The optical network interface of claim 1, wherein said encoder encodes parallel data received from said one receiver buffer as an 8B/10B structure.

* * * * *